United States Patent
Ströby

(10) Patent No.: US 11,247,152 B2
(45) Date of Patent: Feb. 15, 2022

(54) FILTER INSERT AND A FILTER ARRANGEMENT

(71) Applicant: VOLVO TRUCK CORPORATION, Gothenburg (SE)

(72) Inventor: Anders Ströby, Öjersjö (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 83 days.

(21) Appl. No.: 15/755,346

(22) PCT Filed: Sep. 23, 2015

(86) PCT No.: PCT/EP2015/071878
§ 371 (c)(1),
(2) Date: Feb. 26, 2018

(87) PCT Pub. No.: WO2017/050365
PCT Pub. Date: Mar. 30, 2017

(65) Prior Publication Data
US 2018/0243669 A1    Aug. 30, 2018

(51) Int. Cl.
*B01D 35/16* (2006.01)
*B01D 35/153* (2006.01)
(Continued)

(52) U.S. Cl.
CPC .............. *B01D 35/16* (2013.01); *B01D 29/21* (2013.01); *B01D 35/153* (2013.01); *F01M 1/10* (2013.01);
(Continued)

(58) Field of Classification Search
CPC ...... B01D 35/16; B01D 35/153; B01D 29/21; B01D 2201/295; B01D 2201/4007;
(Continued)

(56) References Cited

U.S. PATENT DOCUMENTS 2,955,712 A * 10/1960 Gutkowski .......... B01D 35/147
　　　　　　　　　　　　　　　　　　　　　210/234
3,043,739 A *  7/1962 Giles ...................... B01D 29/21
　　　　　　　　　　　　　　　　　　　　　156/283
(Continued)

FOREIGN PATENT DOCUMENTS

DE  　202005002955 U1    7/2006
EP  　　　0580491 A1 *  1/1994  ............. B01D 29/96
(Continued)

OTHER PUBLICATIONS

Definition of "transverse", Cambridge English Dictionary, Accessed Mar. 9, 2020, pp. 1-6. (Year: 2020).*
(Continued)

*Primary Examiner* — David C Mellon
(74) *Attorney, Agent, or Firm* — Venable LLP; Jeffri A. Kaminski

(57) ABSTRACT

The invention relates to a filter insert (100) for being removably arranged in a filter housing, wherein the filter insert (100) comprises a drainage member (104) projecting from a first end of the filter insert, wherein the drainage member projects in a transverse direction in relation to an axial direction of the filter insert.

11 Claims, 17 Drawing Sheets

(51) Int. Cl.
*B01D 29/21* (2006.01)
*F01M 1/10* (2006.01)

(52) U.S. Cl.
CPC .... *B01D 2201/24* (2013.01); *B01D 2201/295* (2013.01); *B01D 2201/4007* (2013.01); *B01D 2201/4015* (2013.01); *F01M 2001/1057* (2013.01)

(58) Field of Classification Search
CPC ........ B01D 2201/24; B01D 2201/4015; F01M 1/10; F01M 2001/1057
See application file for complete search history.

(56) References Cited

U.S. PATENT DOCUMENTS

| | | | | |
|---|---|---|---|---|
| 5,837,137 A * | 11/1998 | Janik | ...... | B01D 27/06 210/232 |
| 5,846,416 A * | 12/1998 | Gullett | ...... | B01D 29/21 210/232 |
| 5,928,511 A | 7/1999 | Messner et al. | | |
| 6,007,718 A * | 12/1999 | Booth | ...... | B01D 29/15 210/232 |
| 6,156,213 A * | 12/2000 | Dudley | ...... | B01D 41/04 134/138 |
| 6,171,482 B1 * | 1/2001 | Nichols | ...... | B01D 29/21 210/130 |
| 6,572,768 B1 | 6/2003 | Cline et al. | | |
| 7,395,936 B2 * | 7/2008 | Knight | ...... | B01D 29/21 210/436 |
| 8,070,945 B2 * | 12/2011 | Stankowski | ...... | B01D 29/21 210/232 |
| 8,182,682 B1 * | 5/2012 | Rajadhyaksha | ...... | B01D 29/21 210/243 |
| 2006/0016769 A1 * | 1/2006 | Hacker | ...... | B01D 29/055 210/791 |
| 2009/0230063 A1 | 9/2009 | Hawkins et al. | | |
| 2012/0267293 A1 | 10/2012 | Ardes | | |
| 2014/0061113 A1 | 3/2014 | Radeva-Tsanova et al. | | |
| 2017/0028328 A1 * | 2/2017 | Parra | ...... | B01D 29/58 |

FOREIGN PATENT DOCUMENTS

| | | |
|---|---|---|
| EP | 1964600 A1 | 9/2008 |
| WO | 2013162570 A1 | 10/2013 |
| WO | 2014124974 A1 | 8/2014 |

OTHER PUBLICATIONS

English language machine translation of EP 0580491 A1, generated Mar. 16, 2021, pp. 1-7. (Year: 2021).*
International Search Report (dated May 24, 2015) for corresponding International App PCT/EP2015/071878.

* cited by examiner

FILTER INSERT AND A FILTER ARRANGEMENT

BACKGROUND AND SUMMARY

The invention relates to a filter insert and a filter arrangement for cleaning a fluid. More specifically, the filter insert and filter arrangement are adapted for cleaning a fluid for an internal combustion engine, wherein the fluid may be a liquid such as a lubricating oil or fuel or a gas such as air. Such filters may be provided onboard vehicles and in other applications containing transport systems to remove unwanted solids or other contaminants from the fluid. The filter insert may be called filter cartridge or filter module.

The filter arrangement comprises a filter housing, which may be non-removably attached to the internal combustion engine. The filter housing is cup-shaped with an upper open, access end for receipt of the filter insert. The filter housing encompasses at least one inlet for raw fluid to be filtered, which empties into a raw side of the filter housing, and an outlet, which starts at a clean side of the filter housing, for filtered clean fluid. The inlet and outlet are provided in a lower portion of the filter housing. The filter housing defines a longitudinal axis, along which the filter insert can be inserted into the filter housing and removed from it. The filter arrangement further comprises a removable lid for closing the open end of the filter housing during operation. The lid may also be called cover or cap.

The invention can be applied in an internal combustion engine, such as a diesel engine, for heavy-duty vehicles, such as trucks, buses and construction equipment. Although the invention will be described with respect to a diesel engine for a truck, the invention is not restricted to this particular application, but may also be used in other types of engines and for other types of vehicles, such as passenger cars.

U.S. Pat. No. 6,572,768 discloses an oil filter apparatus comprising a housing formed to include an interior region and an aperture, a drainage valve positioned in the interior region for movement relative to the housing between an opened position allowing oil to drain out of the interior region through the aperture and a closed position blocking drainage of oil out of the interior region through the aperture, a filter module positioned in the interior region to filter oil, a valve actuator coupled to the filter module, and an anti-rotation device positioned to block rotation of the filter module relative to the housing to guide the valve actuator into communication with the drainage valve to move the drainage valve to the closed position when the filter module is installed in the interior region.

It is desirable to provide a filter insert, which creates condition for a reliable draining function during movement of the filter insert relative to the filter housing in a space- and/or costefficient way.

According to an aspect of the invention, a filter insert is provided for being removably arranged in a filter housing, wherein the filter insert comprises a drainage member projecting from a first end of the filter insert, characterized in that the drainage member projects in a transverse direction in relation to an axial direction of the filter insert.

The filter insert is preferably symmetrical around a centre axis (except for the projecting drainage member). The axial direction is in parallel with the centre axis of the filter insert and will be in line with a longitudinal axis of the filter housing when the filter insert is in an operational position in the housing. Especially, the filter insert may have a cylindrical shape, wherein the axial direction is in parallel with the centre axis of the filter insert. Thus, the drainage member projects from an envelope surface of the filter insert in a transverse direction from the axial direction.

The drainage member may be formed by a drainage valve actuator for actuating a drainage valve in the filter housing to move the drainage valve to a closed position when the filter insert is inserted towards its operational position in an interior region of the filter housing and to an open position when the filter insert is removed from its operational position inside the filter housing.

Thus, the drainage member is adapted for closing and opening, respectively, a drainage aperture via the drainage valve. In this way, the drainage member itself can be designed in a cost-efficient way, preferably as a rigid body, which is rigidly attached to the filter insert. Thus, since the drainage valve is arranged in the filter housing, the drainage member is adapted for actuating the valve and can therefore be free of any sealing means.

The drainage member may form part of a device for guiding the filter insert relative to the filter housing and simultaneously guiding the drainage member itself to actuating the drainage valve. More specifically, the drainage member may be designed for a sliding engagement with an inner peripheral wall of the filter housing without having to consider any sealing functionality.

Further, by the provision of this filter insert with a radially projecting drainage member, the drainage valve and aperture may be positioned radially besides an area of a bottom of the filter housing defined by the circumference of the filter insert. Thus, this area defined by the circumference of the filter insert is in its entirety available for other functionality, such as inlets for the raw fluid and/or outlets for the clean fluid.

According to one embodiment, the drainage member is adapted to engage a groove in an inner peripheral wall of the filter housing for guiding the filter insert relative to the filter housing during insertion and/or removal. Preferably, the drainage member is at the end of the insertion operation guided to actuate the drainage valve for closing the drainage aperture in the filter housing. Preferably, the drainage member is at the start of the removal operation guided to release the drainage valve and open the drainage aperture in the filter housing.

Thus, the drainage member may form a part of a device for guiding the filter insert relative to the filter housing and simultaneously guiding of the drainage member itself to actuating the drainage valve when the filter insert is installed in the interior region. Preferably, the filter insert is adapted so that a surface of the drainage member glides along an interior surface of the groove.

More specifically, the drainage member is adapted to effect the drainage valve to actuate opening of the drainage aperture allowing fluid to drain out of an interior region of the filter housing through the aperture and closing of the drainage aperture blocking drainage of fluid out of the interior region through the aperture, wherein the drainage aperture is positioned radially outside of an inner peripheral wall of the filter housing defining the interior region.

Preferably, the groove is correspondingly sized and shaped relative to the drainage member for a close fit in order for the drainage member to slide along the groove during movement of the filter insert relative to the filter housing.

According to a further embodiment, the drainage member comprises a part with a rounded surface for engaging the groove in the inner peripheral wall of the filter housing. Preferably, the drainage member may have a ball shaped or spherical portion, which defines the rounded surface. The ball shaped portion is preferably formed by a rigid body rigidly attached to a lower panel of the filter insert. The ball shaped portion is preferably formed in one piece with the lower panel of the filter insert. A rounded surface is especially advantageous in gliding along a corresponding surface in the groove and contacting a drainage valve for closing/opening the drainage valve.

According to a further embodiment, the drainage member projects perpendicularly in relation to the axial direction of the filter insert. This creates for a space-efficient and strong design.

According to a further embodiment, an outer circumference of the filter insert has a circular shape. The drainage member will then project from this circular shape in a view in the axial direction of the filter insert. According to a further embodiment, the filter insert comprises a filter material body (filter media). The filter material body is preferably cylindrical. Further, the filter material body is preferably hollow. The filter material body may be formed by a pleated paper structure forming a hollow circular cylinder. Preferably, the drainage member projects radially outwards relative to an outer circumference of the filter material body of the filter insert.

According to a further embodiment, the filter insert comprises a filter material body support structure at at least one end of the filter insert in its axial direction, wherein the filter material body support structure has a main extension in a radial direction of the filter insert and wherein the drainage member is rigidly connected to the filter material body support structure. This creates for a space-efficient and strong design. The filter material body support structure will in the following be referred to as a panel. The filter insert comprises an upper and lower panel delimiting the filter material body on opposite sides in the axial direction.

Preferably, both the filter material body and the panels have a circular shape of the outer circumference. Further preferably, a circular shape of the filter material body and the panels have the same or substantially the same diameter. Designing the panels with a circular shape of the outer circumference creates conditions for a rotating or turning movement of the filter insert during insertion/withdrawal. Further, designing the filter material body with a circular shape of the outer circumference creates conditions for a proper filtering operation in that the same gap can be provided around the filter material body relative to an inner circular wall of the filter housing. Preferably, the drainage member is positioned at one end of the filter insert.

According to a further embodiment, the filter insert comprises means for engagement with a filter insert removal tool. Preferably, the engagement means forms a part of a bayonet catch. Further preferably, the bayonet catch engagement means is arranged on an upper, free side of the upper panel. The bayonet catch engagement means is preferably arranged in a one-piece unit with the upper panel. The bayonet catch engagement means may be formed by a plurality of circumferentially spaced projections.

It is also desirable to provide a filter arrangement, which creates condition for a reliable draining function during movement of the filter insert relative to the filter housing in a space- and/or costefficient way.

According to a further aspect of the invention, filter arrangement is provided comprising
 a filter insert according to any one of the embodiments above, and
 a filter housing comprising an interior region for receiving the filter insert and a drainage valve for actuation by the drainage member, wherein the drainage valve is adapted to open a drainage aperture allowing fluid to drain out of the interior region through the aperture and close the drainage aperture blocking drainage of fluid out of the interior region through the aperture, wherein the drainage valve is positioned radially outside of an inner peripheral wall of the filter housing defining the interior region.

According to a further embodiment, the drainage valve comprises a seat for receipt of the drainage member. The drainage valve may be formed by a body having a lower surface adapted to close the aperture and an upper surface comprising the seat for the drainage member. A spring member may be adapted for urging the drainage valve away from the aperture.

According to a further embodiment, the inner peripheral wall of the filter housing is provided with a groove for engagement with the drainage member during movement of the filter insert relative to the filter housing. Preferably, the groove extends from an upper access opening for receipt of the filter insert to a lower region of the filter housing in association with the drainage valve. Thus, the groove is arranged for guiding the drainage member all the way from entry of the filter insert into the filter housing until the filter insert is completely inserted in its operative position.

According to a further development of the last-mentioned embodiment, the groove has a first portion with a straight extension. Preferably, the first portion of the groove has an extension in parallel with the axial direction of the filter insert from the access opening to the lower region of the filter housing. Preferably, the groove has a second portion in communication with the first portion, wherein the second portion has a transverse extension relative to the axial direction of the filter insert.

According to an alternative to the last-mentioned embodiment, the groove has a first portion with a helical extension. Preferably, the first helical portion of the groove extends from the access opening to the lower region of the filter housing.

According to this alternative, a lower surface of the drainage member, ie a surface facing in the axial direction of the filter insert towards a bottom of the filter housing, is arranged to both glide along a surface of the groove during insertion and contact a drainage valve for closing the drainage valve. It may be cost-effective to combine both functions into the design of the same contact surface. This lower surface is preferably rounded and the groove is preferably rounded in a complimentary way for glidingly receiving the drainage member.

According to a further embodiment, the filter arrangement comprises a lid for closing a filter insert access opening of the filter housing, wherein the lid and the filter arrangement have complimentary engagement means. The complimentary engagement means may be formed by a threaded connection.

According to a further development of the last-mentioned embodiment, the lid has a spring arranged for urging an upper surface of the filter insert so that the spring of the drainage valve is compressed by the drainage member in an operative position.

According to a further alternative, the filter arrangement comprises a filter insert removal tool with means for engaging the engagement means of the filter insert and removal of the filter insert after removal of the lid. Preferably, the engagement means of the filter insert removal tool forms a part of a bayonet catch.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
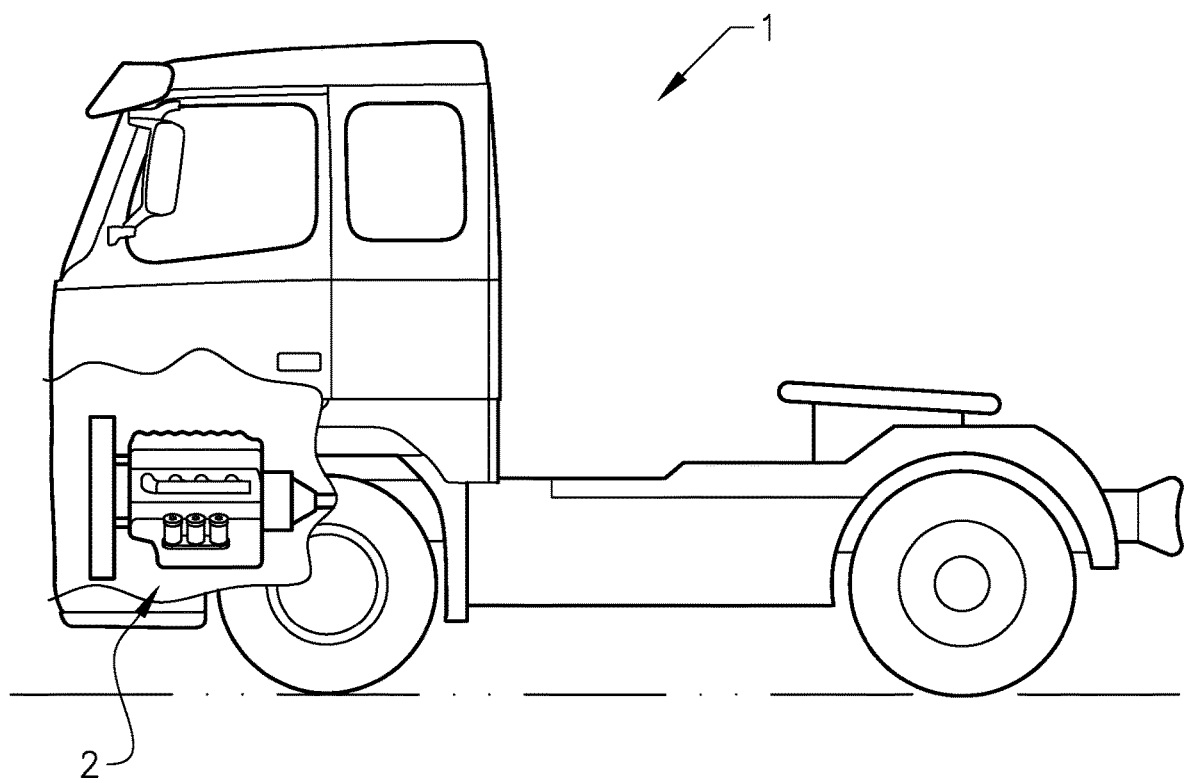
FIG. 1 discloses a vehicle in the form of a truck in a side view.

FIG. 1 discloses a vehicle in the form of a truck 1 in a partly cut side view. Further, an internal combustion engine (ICE) in the form of a diesel engine 2 for propelling the truck is indicated.

Figure 2:
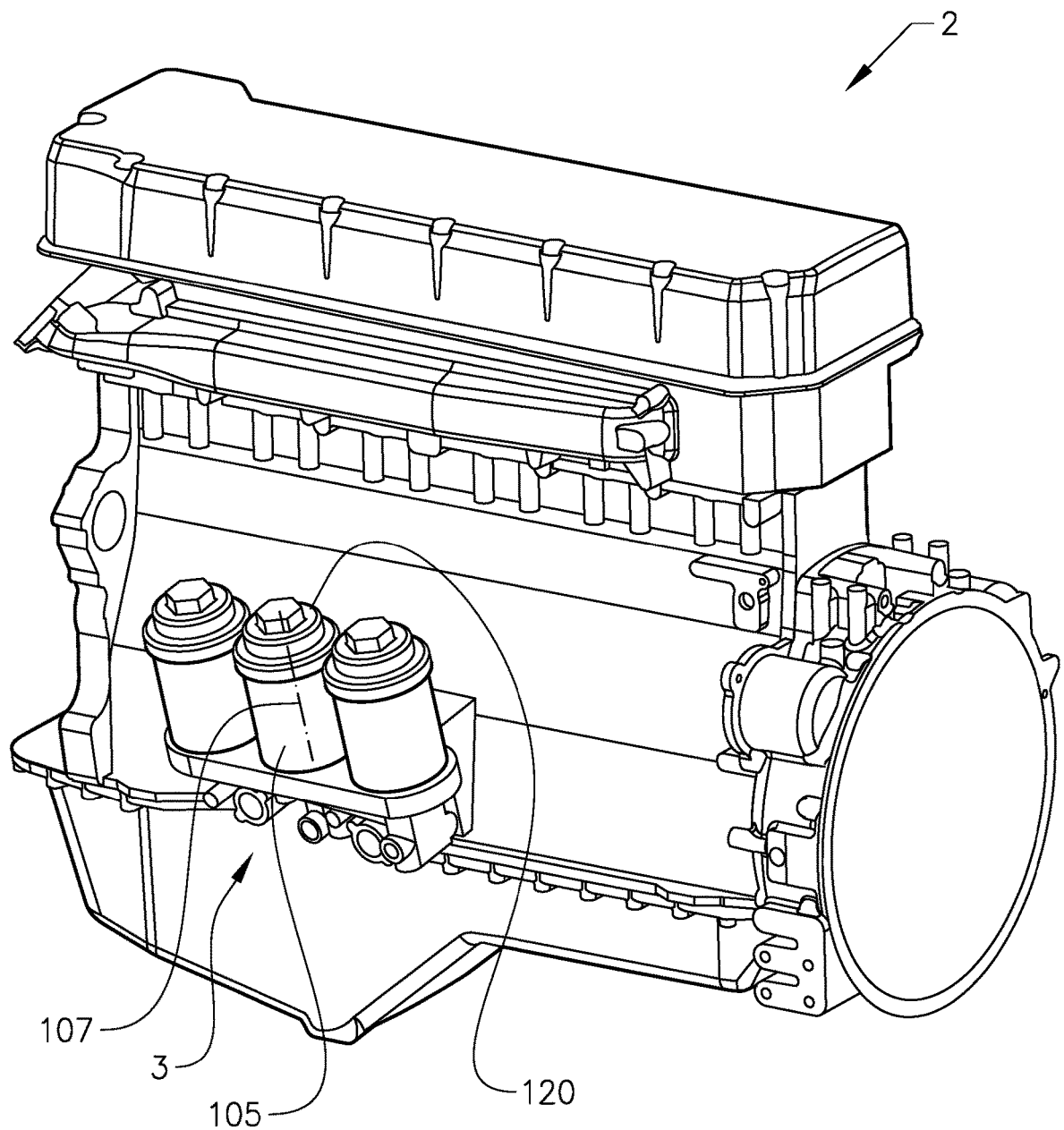
FIG. 2 discloses an internal combustion engine of the truck in a perspective view with a filter arrangement attached, FIG. 3 discloses the filter arrangement of FIG. 2 in a partly assembled state.

FIG. 2 shows the internal combustion engine 2 provided with a filter arrangement 3 according to a first embodiment example of the invention. The filter arrangement 3 is adapted for filtering a fluid for the internal combustion engine. More specifically, there are three filter arrangements 3 arranged in parallel with each other. The filter arrangement 3 comprises a filter housing 105, which is non-removably attached to the internal combustion engine. The filter arrangement 3 is in an upright, standing position, slightly inclined outwards from its attachment at the bottom relative to a side of the ICE. A lower section of the filter arrangement 3 comprises inlets and outlets. The filter housing 105 is in the form of a cup-shaped part, which is rigidly attached to the lower section. The filter housing 105 defines a longitudinal axis 107 along which a filter insert (not shown) can be inserted into the filter housing and removed from the filter housing via an upper access opening. The filter arrangement 3 further comprises a lid 120 for closing the filter insert opening of the filter housing.

Figure 3:
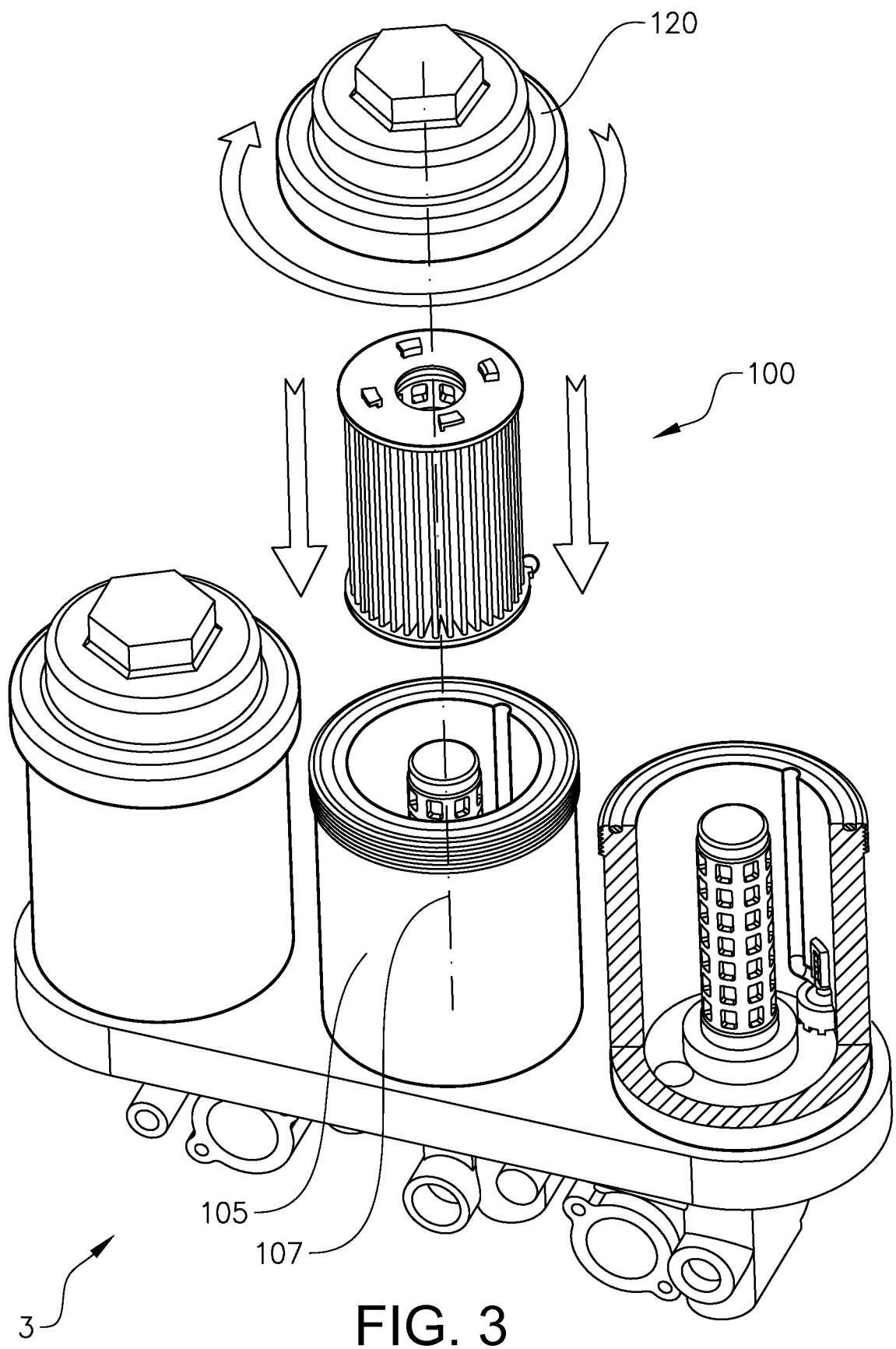

FIG. 3 discloses the filter arrangement 3 of FIG. 2 in a partly assembled state. A filter insert 100 according to a first embodiment example is first inserted into the filter housing 105 via first an axial movement and then a rotational movement around the longitudinal axis 107. After positioning the filter insert 100 in the filter housing 105, the lid is attached to the filter housing, thereby closing the upper access opening.

Figure 4:
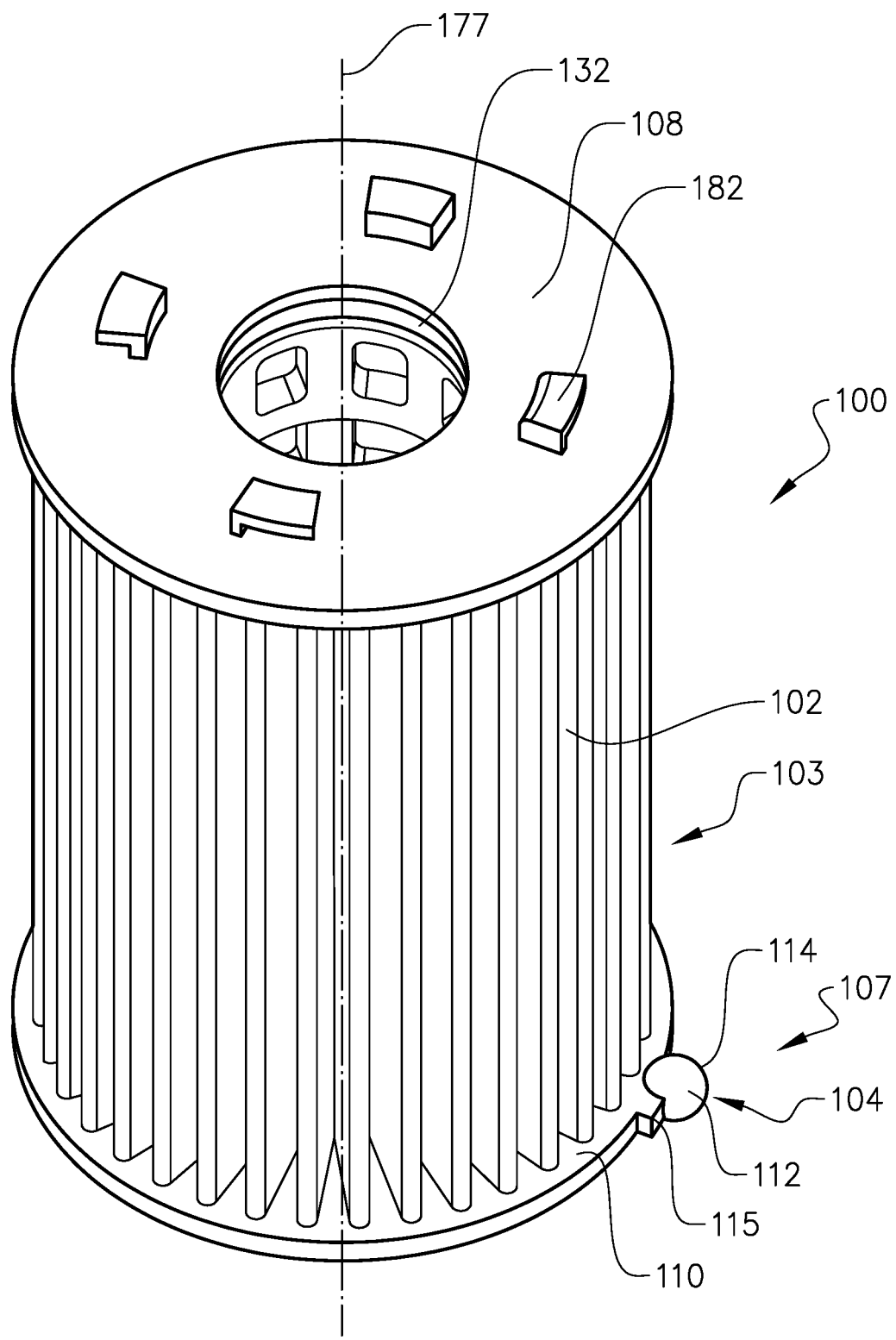
FIG. 4 is a perspective view from the top of a filter insert according to a first embodiment example.
Figure 5:
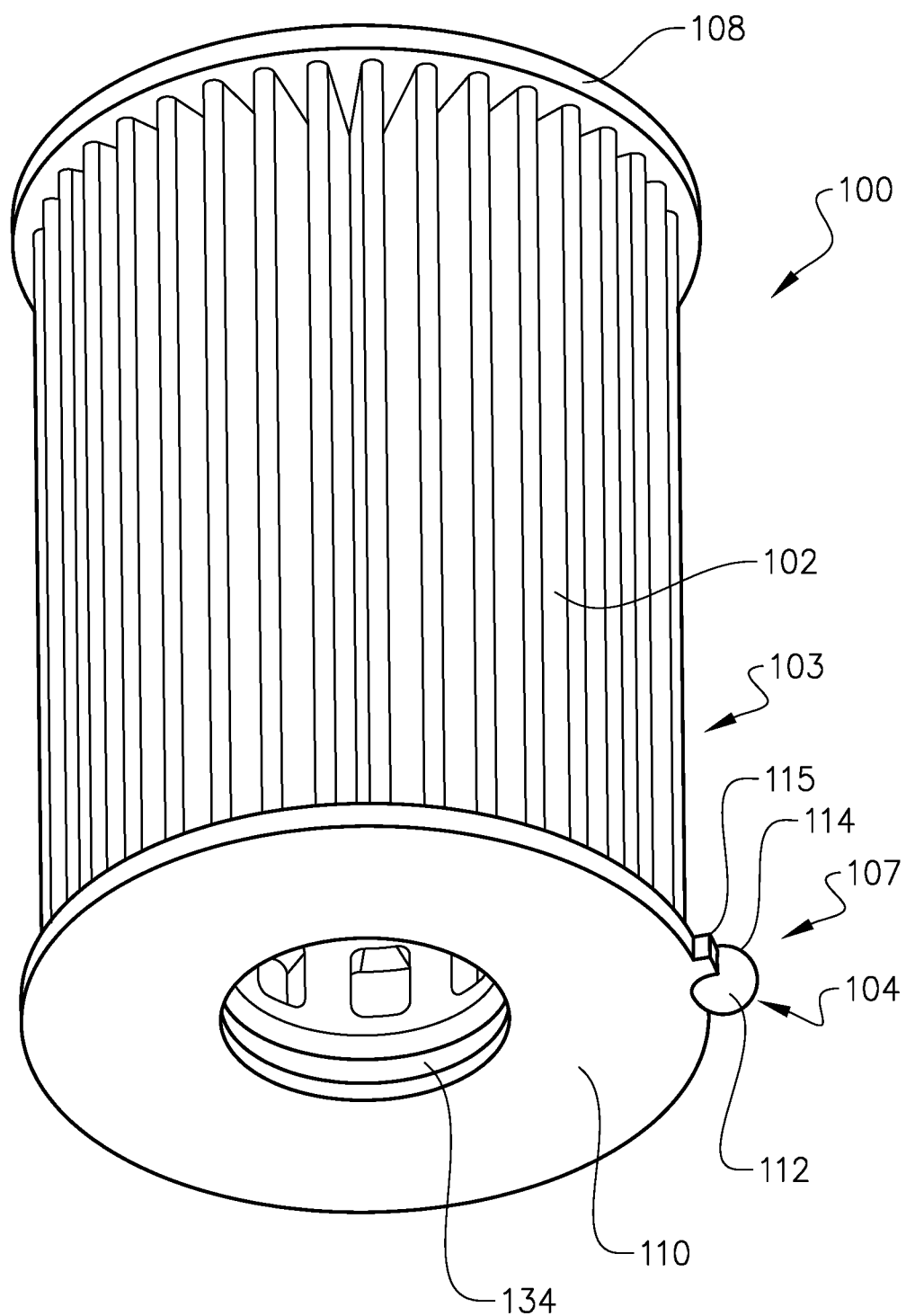
FIG. 5 is a perspective view from below of the filter insert according to the first embodiment example.
Figure 6:
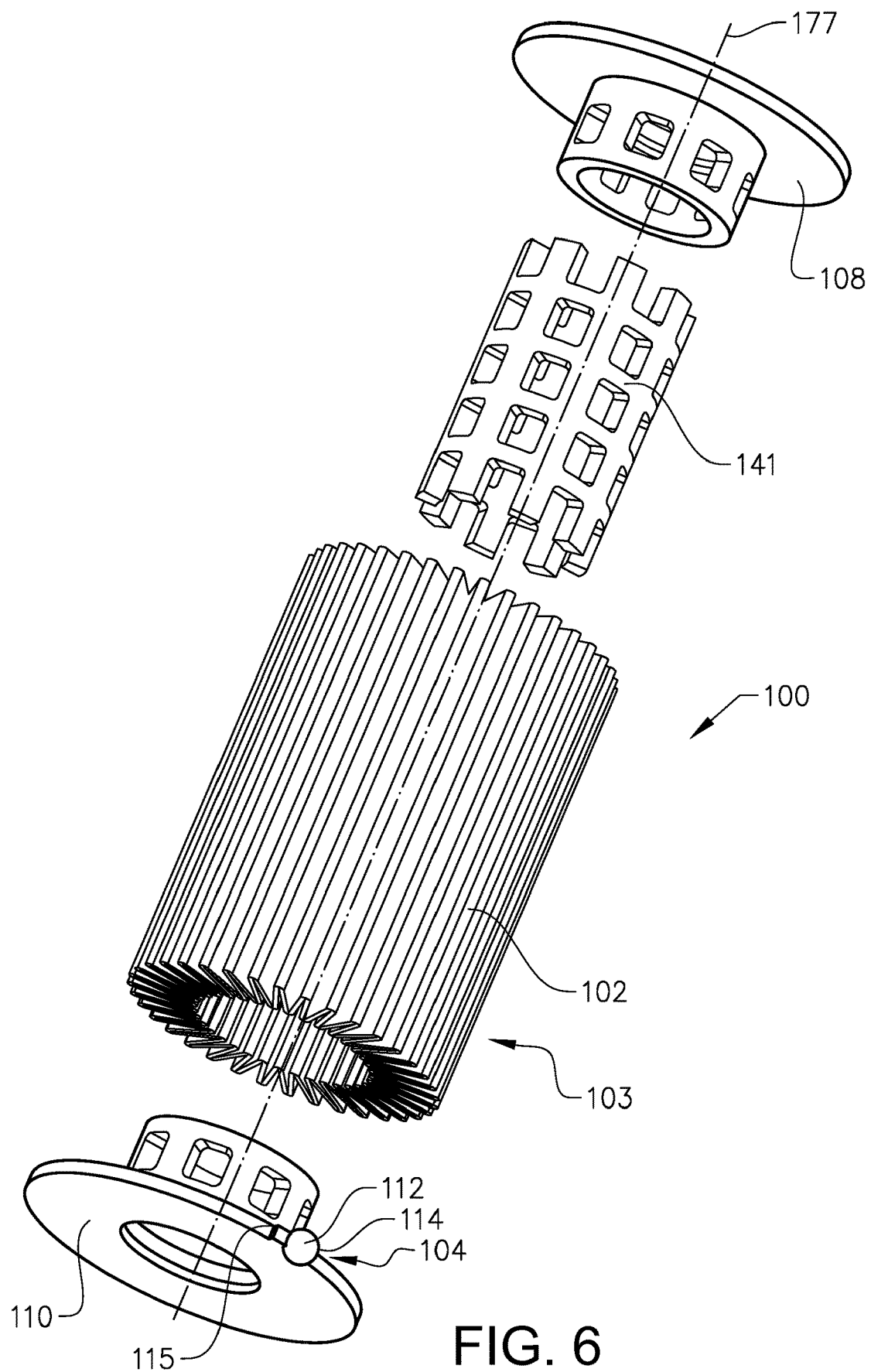
FIG. 6 is an exploded perspective view of the filter insert according to the first embodiment example.

FIG. 4-6 shows the filter insert 100 according to a first embodiment example for being removably arranged in the filter housing 105. The filter insert 100 comprises a filter material body 102. The filter material body 102 has a hollow circular cylindrical shape. Thus, the filter material body 102 has an external cross sectional shape generally defining a circle. Further, the filter material body 102 has an internal cross sectional shape generally defining a circle. Further, the filter material body 102 is formed by a pleated structure. More specifically, the filter material body 102 is formed by an elongated sheet of paper (strip), which has been folded successively back and forth and configured to assume the cylindrical shape, for example via rolling. The cylindrical filter material body 102 has its axis parallel to the line of the pleatings.

The filter insert 100 further comprises a filter material body support structure 108,110 at each end of the filter insert in its axial direction 177. The filter material body support structures 108,110 have a main extension in a radial direction of the filter insert. Each of the filter material body support structures 108,110 has a plate shaped structure extending in a plane perpendicular to the axial direction of the filter insert. The filter material body support structures 108,110 will in the following be referred to as an upper and lower panel 108,110. Thus, the filter material body 102 is delimited on the top by the upper panel 108 and on the bottom by the lower panel 110. The panels 108,110 may be formed by separate parts attached to the filter material body 102. The filter material body 102 is then bonded to the upper panel 108 and the lower panel 110 at the edges of the filter paper in the axial direction of the filter insert. The panels 108,110 may be made of plastics and the filter material body 102 is connected to the panels by non-contact infrared bonding or other bonding processes, such as hot-plate bonding. Alternatively, the panels 108,110 are formed by a glue or other fastening fluid attached to the edges of the filter material body 102 in the axial direction of the filter insert and then solidified.

The filter insert 100 further comprises a drainage member 104 projecting from a first end 107 of the filter insert, wherein the drainage member 104 projects in a transverse direction in relation to the axial direction 177 of the filter insert. More specifically, the drainage member 104 projects perpendicularly in relation to the axial direction 177 of the filter insert 100. Preferably, the drainage member projects radially in parallel with an extension plane of the lower panel 110. The drainage member 104 comprises a part 112 with a rounded surface 114 for engaging a groove 106 in an inner peripheral wall 150 of the filter housing 105, see FIG. 7a. The part 112 has a substantially larger extension in the axial direction 177 of the filter insert than a thickness of the lower panel 110. More specifically, the drainage member extends symmetrically in relation to the lower panel 110. In other words, the drainage member extends to a similar extent axially on each side of the lower panel. The part 112 with a rounded surface 114 is in the shown embodiment spherical. The lower panel 110 comprises a radially projecting holder part 115 forming a support for a rigid attachment of the spherical part 112. The spherical part 112 may for example be rigidly attached to the lower panel 110 via welding. Alternatively, the drainage member 104 is formed in one piece with the lower panel 110. The drainage member 104 is adapted to actuate a drainage valve 116 in the filter housing 105 for movement of the drainage valve relative to an aperture in the filter housing, see FIG. 7a.

Figure 7A:
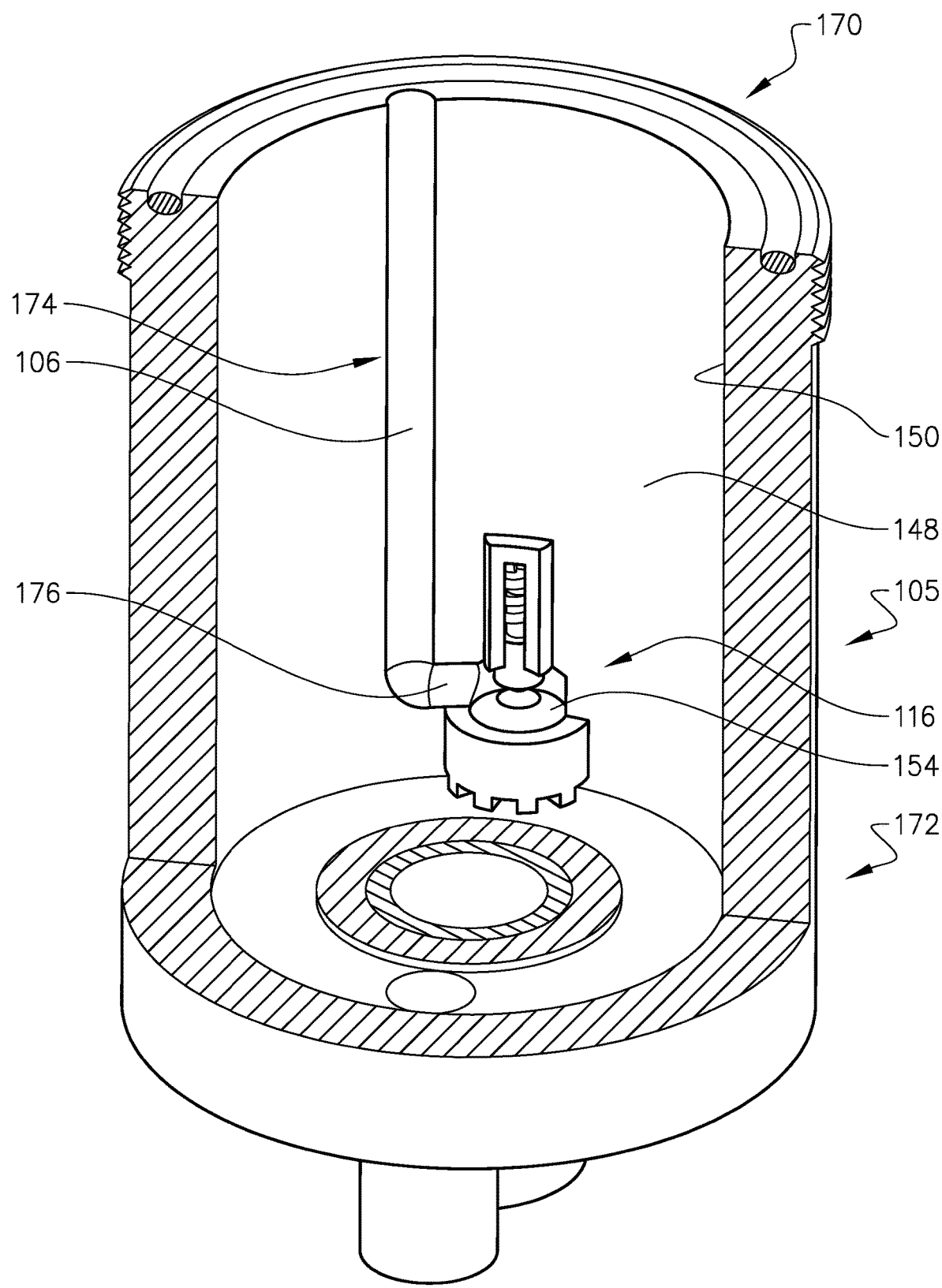
FIG. 7a is a partially cut perspective view from the top of a filter housing according to a first embodiment example.
Figure 7B:
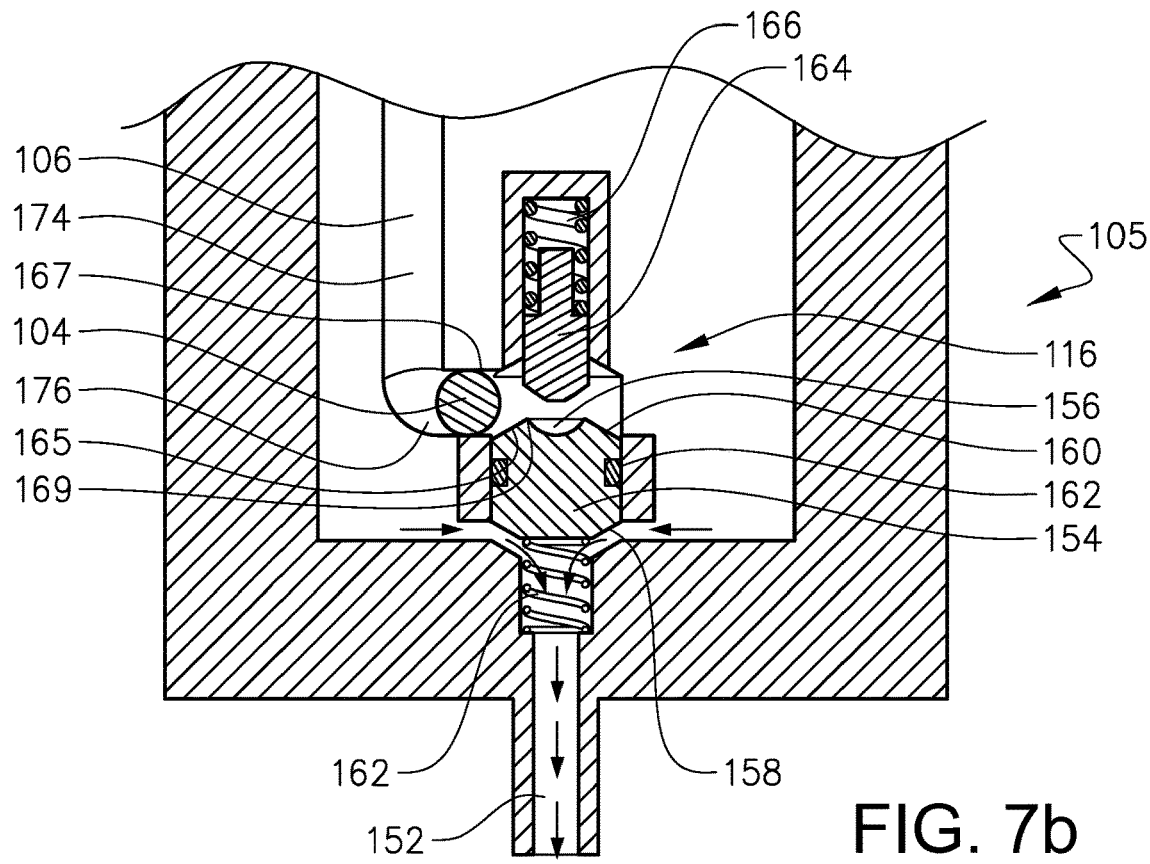
FIGS. 7b and 7c shows a drainage valve in the filter housing of FIG. 7a in an open and closed state, respectively.
Figure 7C:
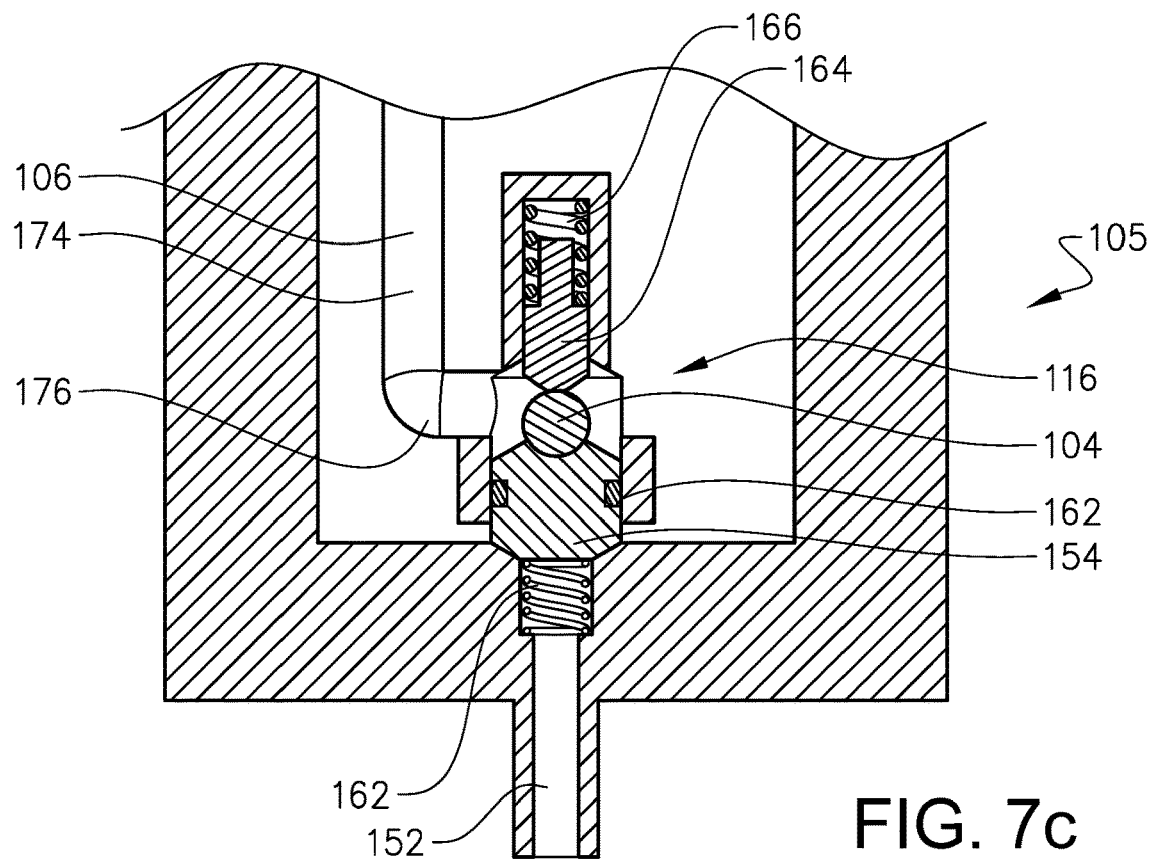
Figure 8:
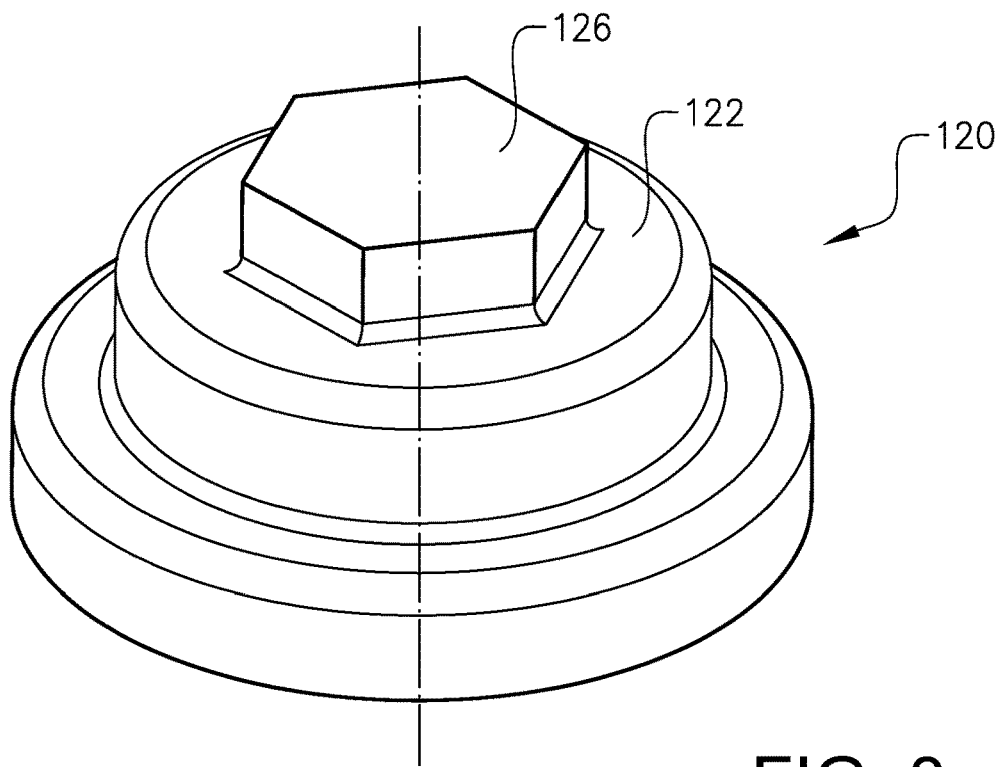
FIG. 8 is a perspective view from the top of a lid according to a first embodiment example.
Figure 9:
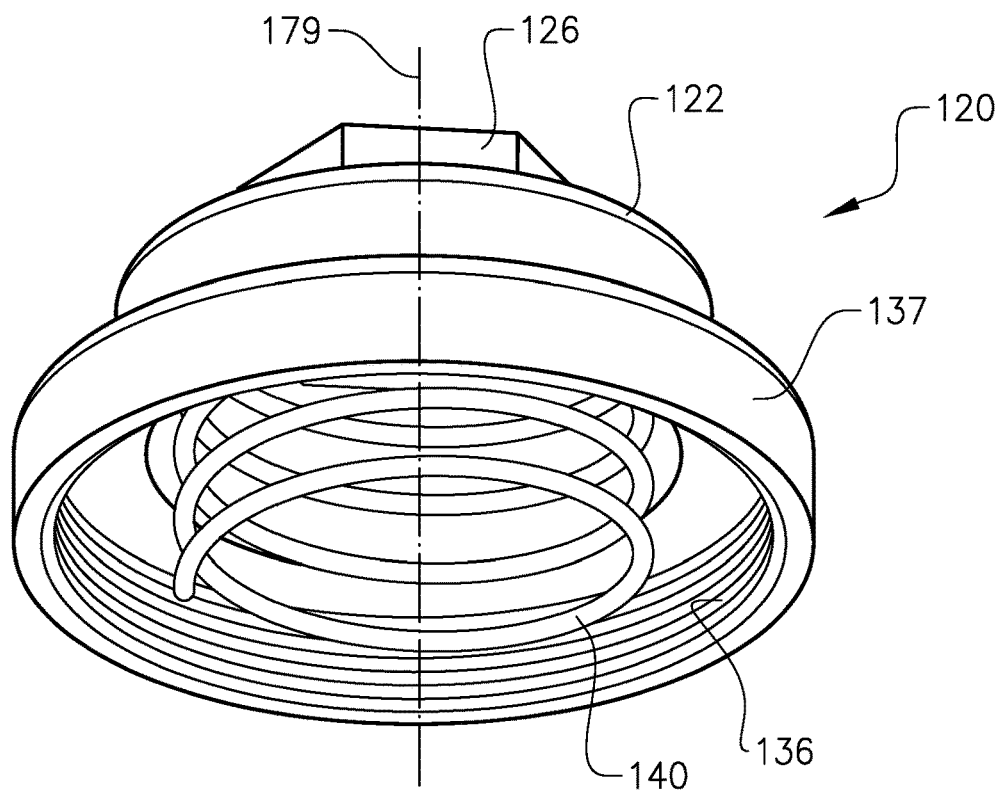
FIG. 9 is a perspective view from below of the lid according to the first embodiment example.

The drainage member 104 is adapted to engage the groove 106 in the inner peripheral wall 150 of the filter housing 105, see FIGS. 7-9, for guiding the filter insert 100 during movement relative to the filter housing.

An outer circumference 103 of the filter insert 100 has a circular shape. Further, the drainage member 104 projects radially relative to the outer circumference 103 of the filter insert.

The filter insert 100 further comprises sealing means 132,134 for sealingly engage an inner surface of the filter housing 105 in order to separate a raw side from a clean side of the filtering arrangement. A first sealing means 132 in the form of a ring is provided on an external side of the upper panel 108 for a sealing engagement with the lid 120, see FIGS. 8-9. A second sealing means 134 in the form of a ring is provided on an external side of the lower panel 110 for a sealing engagement with a bottom surface of the filter housing 105. Further, the sealing means may be realized via metallic surfaces.

Further, the filter insert 100 comprises a fluid permeable centre tube 141 in the form of a grid, see FIG. 6, forming a support for the filter material body 102 against collapsing. The fluid permeable centre tube 141 extends between the upper and lower panel 108,100. According to an alternative, the filter insert 100 does not have any such fluid permeable centre tube 141. The required rigidity of the filter insert 100 may be achieved in other ways, such as by reinforcement of the filter material body 102.

Figure 12:
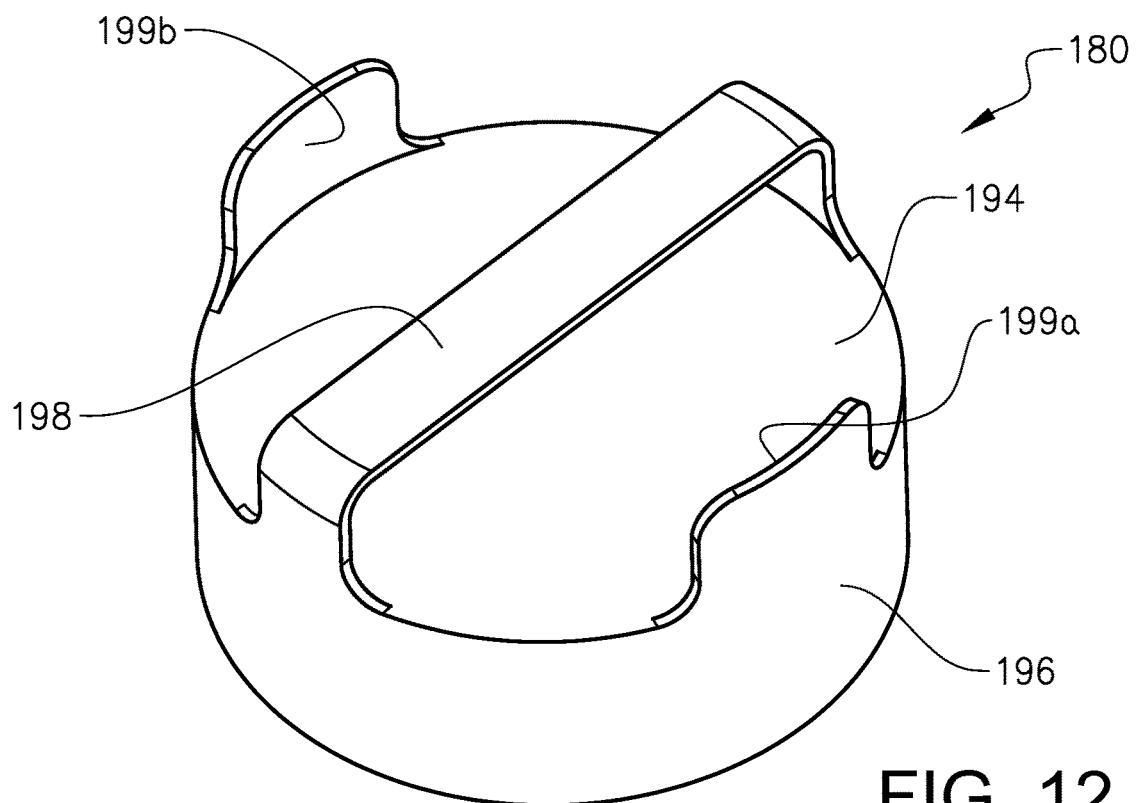
Figure 13:
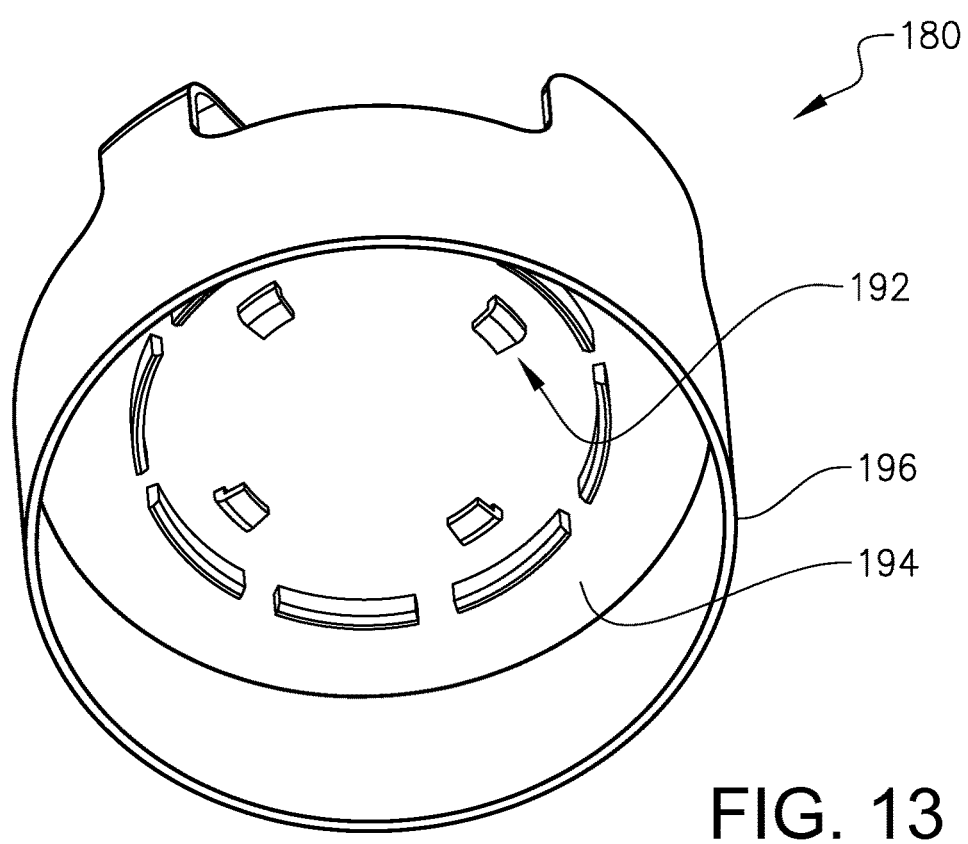

The filter insert 100 comprises means 182 for engaging a complimentary shaped engagement means 192 of a filter insert removal tool, 180, see FIGS. 12 and 13. The engagement means 182,192 forms a bayonet catch connection. The engagement means 182 comprises a plurality of circumferentially spaced engagement elements in the form of hooks for engagement with a complimentary structure of the filter insert removal tool 180.

FIG. 7a is a partially cut perspective view from the top of the filter housing 105 according to a first embodiment example. The filter housing 105 comprises an interior region 148 for receiving the filter insert 100. More specifically, the filter housing 105 has a cylindrical inner wall 150 with a circular cross section. The diameter of the circular cylindrical wall 150 is matched to the diameter of the filter material body 102 establishing a gap between them.

Further, the filter housing 105 comprises a drainage aperture 152, see FIGS. 7b and c, wherein the drainage member 104 is adapted to actuate opening of the drainage aperture 152 allowing fluid to drain out of the interior region through the aperture and closing of the drainage aperture 152 blocking drainage of fluid out of the interior region through the aperture, wherein the drainage aperture is positioned radially outside of the inner peripheral wall 150 of the filter housing defining the interior region.

The filter housing 105 further comprises a drainage valve 154 for movement relative to the filter housing wall between an opened position, see FIG. 7b, allowing fluid to drain out of the interior region through the aperture 152 and a closed position, see FIG. 7c, blocking drainage of fluid out of the interior region through the aperture 152. The drainage valve 154 is adapted to be actuated by the drainage member 104 of the filter insert 100.

The drainage valve 154 comprises a seat 156 for receipt of the drainage member 104. The drainage valve 154 is formed by a body having a lower surface 158 adapted to close the aperture and an upper surface 160 comprising the seat for the drainage member 104. The drainage valve body 154 is provided with sealing means 162 on its periphery for sealingly engage with a stationary wall portion arranged inside of the filter housing. The sealing means 162 comprises at least one sealing ring, which surrounds the drainage valve body 154.

Further, a first spring member 162 is arranged for urging the drainage valve 154 away from the aperture 152. Further, a spring-loaded member 164 is arranged opposite the seat 156 of the drainage valve body 154 and facing the seat 156. A second spring member 166 is arranged for urging the member 162 towards the seat 156.

The inner peripheral wall 150 of the filter housing 105 is provided with a groove 106 for engagement with the drainage member 104 during movement of the filter insert 100 relative to the filter housing. The groove 106 extends from an upper access opening 170 in the filter housing 105 for receipt of the filter insert 100 to a lower region 172 of the filter housing 105 in association with the drainage valve 154. The groove 106 has a first portion 174 with a straight extension. The first portion 174 of the groove has an extension in parallel with the longitudinal direction 107 of the filter housing 105 from the access opening 170 to the lower region 172 of the filter housing. Further, the groove 106 has a second portion 176 positioned in the lower region 172 of the filter housing and in communication with the first portion 174, wherein the second portion 176 has a transverse extension relative to the longitudinal direction 107 of the filter housing 105. More specifically, the second portion 176 has an extension perpendicular to the longitudinal direction 107. More specifically, the second portion 176 is curved, following the curvature of the inner wall 150.

A wall 167 of the housing 105 is positioned at an axial distance from the drainage valve body 154 matching an axial extension of the drainage member 104 so that the drainage member 104 will ride along an inclined surface 165 of the drainage valve body 154 while simultaneously being in contact with the opposite wall 167 of the housing. Accordingly, at a final portion of an operation for inserting the filter insert 100 into the filter housing, the drainage member 104 will ride along the inclined surface 165 of the drainage valve body 154 while simultaneously being in contact with the opposite wall 167 of the housing. By further turning the filter insert 100, the drainage valve body 154 will be moved downwards towards the aperture 152 until the drainage member 104 passes a crest 169 defining the seat 156. When the drainage member 104 enters its associated reception at the mouth of the aperture 152, the drainage member 104 will come into contact with the spring loaded second member 164, wherein the drainage valve 154 is stopped from moving upwards while the drainage member enters its associated seat 156.

Figure 10A:
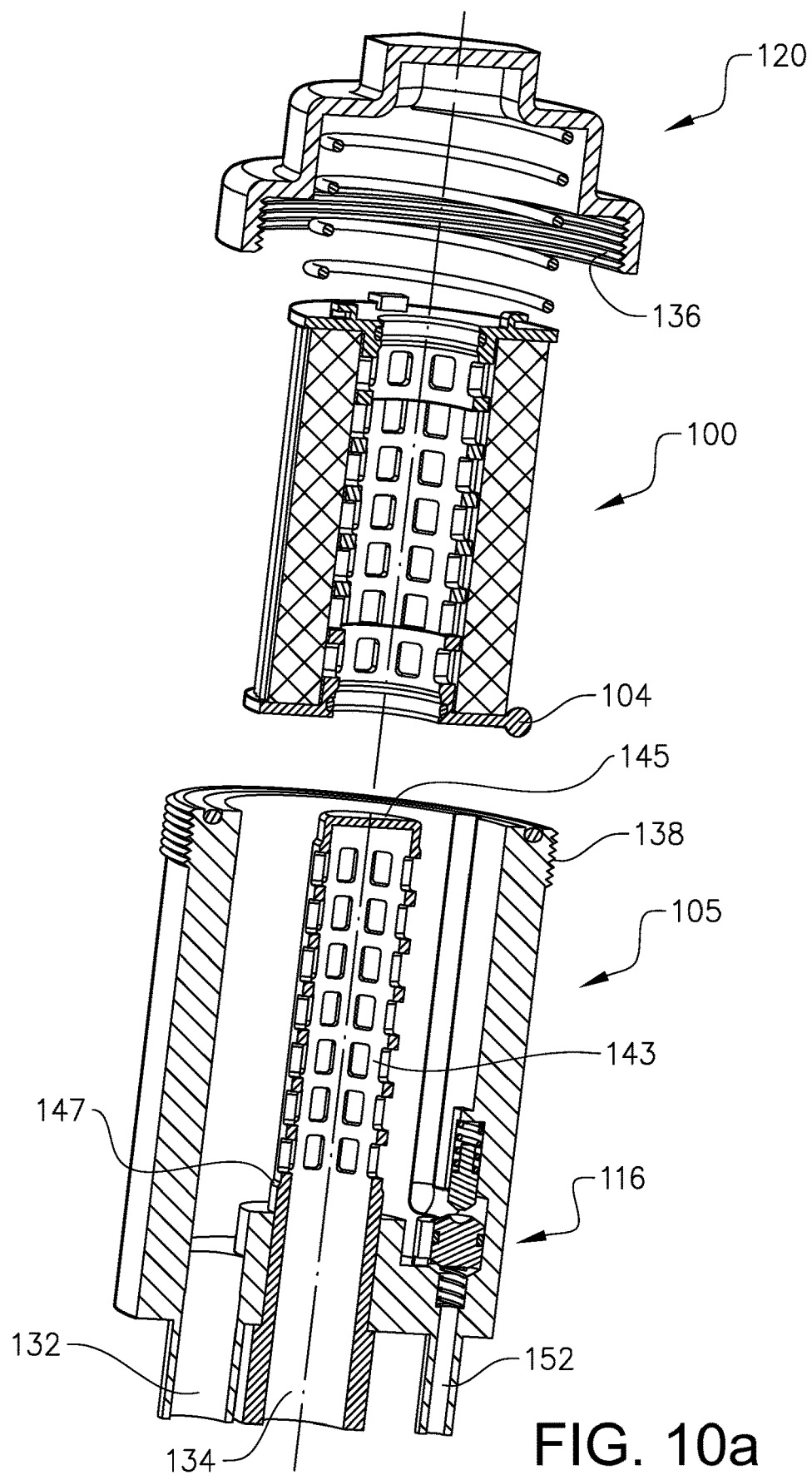
FIG. 10a is an exploded view of a filter arrangement according to a first embodiment example comprising the filter insert, lid and filter housing according to FIGS. 4-9.

The filter housing 105 further comprises a fluid permeable tubular centre post 143, see FIG. 10a, for being received in the centre opening in the filter insert 100. The centre post 143 is grid-shaped. An upper, free end 145 of the fluid permeable tubular centre post 143 is closed. The fluid permeable tubular centre post 143 is arranged for receipt in the opening of the filter insert 100 to guide the filter insert to its correct operational position. A lower end 147 of the fluid permeable tubular centre post 143 is rigidly attached to the lower portion 172 of the filter housing 105. The upper end 145 of the fluid permeable tubular centre post 143 has a reduced cross section and is preferably cone-shaped for receipt in the opening of the filter insert at an upper portion thereof. Similarly, the lower end 147 of the fluid permeable tubular centre post 143 has an increased cross section and is preferably cone-shaped for receipt in the opening of the filter insert at a lower portion thereof.

For securing operation of the filter arrangement, the openings in the fluid permeable centre tube 141 should overlap the openings in the fluid permeable tubular centre post 143. This may be achieved in designing the openings in the fluid permeable centre tube 141 complimentary to the openings in the fluid permeable tubular centre post 143 and/or securing an angular position of the filter insert 100 inside the housing 105 in the operational position is such that the openings in the fluid permeable centre tube 141 overlap the openings in the fluid permeable tubular centre post 143.

Figure 10B:
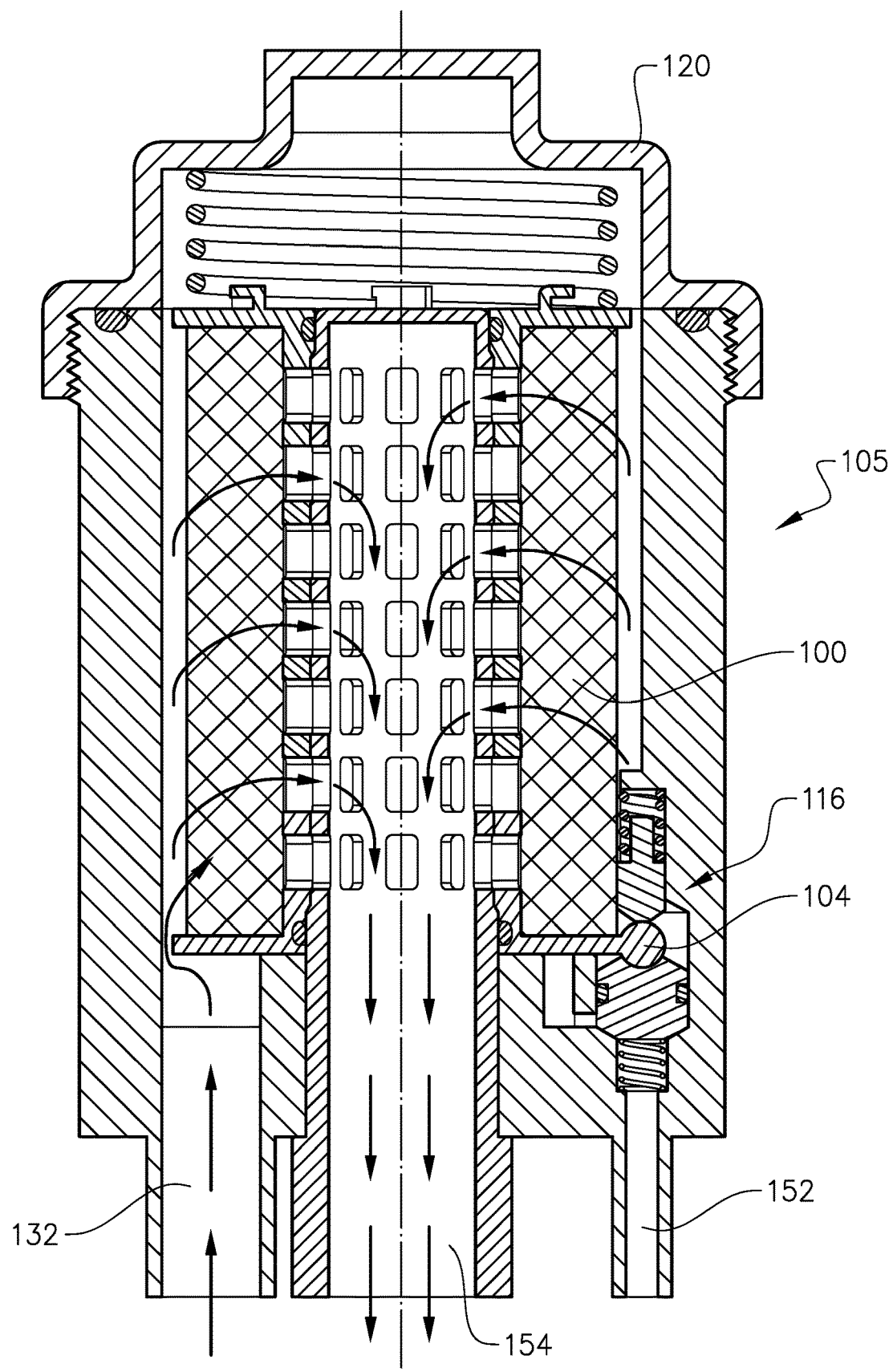
FIG. 10b is a cross sectional side view of the filter arrangement in FIG. 10a, FIG. 11 discloses a second embodiment example of a filter housing according to a second embodiment example in a similar view as in FIG. 7a, FIGS. 12 and 13 are perspective views from the top and below, respectively, of a filter insert removal tool according to a first embodiment example, FIGS. 14 and 15 discloses attachment of the filter insert removal tool to a used filter insert positioned in the filter housing and removal of the filter insert, respectively, FIG. 16 discloses a perspective view from the top of a filter insert according to a second embodiment example, and FIG. 17 discloses the filter insert according to the first embodiment example positioned inside a transport box.

Turning now to FIG. 10a, the filter housing 105 comprises an inlet 132 for receipt of a raw fluid to be filtered, which empties into a raw side of the filter housing, and an outlet or return 134, which starts at a clean side of the filter housing, for filtered clean fluid. The inlet 132 and outlet 134 are provided in the lower region 172 of the filter housing 105. The inlet 132 and outlet 134 are in communication with different sides of the filter material body 102. More specifically, the outlet 134 is provided in a bottom wall of the filter housing and positioned radially centrally and adapted to match the position of the centre opening in the fluid permeable centre post 143. The outlet 134 is thus fluid communication with an interior side of the fluid permeable tubular centre post 143. Further, the inlet 132 is positioned radially eccentric in the bottom wall of the filter housing for distributing the fluid to a radially external side of the filter material body 102. The direction of the fluid inside the filter arrangement is disclosed in FIG. 10b. By flowing through the filter material body 102, the liquid flows to the clean side of the filter housing (the radially interior space) while dirt particles are retained in the filter material body 102. The filtered liquid flows off through the outlet (return) 134.

FIG. 8-9 shows the lid 120 according to a first embodiment example for being removably attached to the filter housing 105. The lid 120 comprises a plate shaped portion 122, and engagement means 126 arranged on a second, upper side of the plate shaped portion 122, for engagement with a tool during insertion and removal of the filter insert 100, if necessary. The engagement means 126 has a peripheral polygonal shape for engagement with a correspondingly designed removal tool. The engagement means 126 is here in the form of an axial projection. According to an alternative, the removal tool may be formed by an axial recess. The plate shaped portion 122, and engagement means 126 are formed in a one-piece unit.

Further, the lid 120 comprises a first fastening means 136 for engagement with a second fastening means 138 of the filter housing 105, see FIG. 10 for removably fastening the filter housing lid 120 to the filter housing 105. More specifically, the lid 120 comprises a circular wall 137 projecting axially from a periphery of the plate shaped portion 122. The first fastening means 136 is formed in said circular wall 137. The wall 137 is formed in a one-piece unit with the plate shaped portion 122. The first fastening means 136 forms a threaded structure. Further, the first fastening means 136 is arranged on a radially interior side of the wall 137.

Further, the lid 120 comprises a spring 140 adapted with a substantially stronger spring force than the spring force of the valve spring 162 for securing closing of the drainage aperture via the drainage valve 154 when the lid is screwed onto the filter housing 105. A first end of the spring is attached to an inside of the plate shaped portion 122 and projects along an axis 179 of the lid 120, wherein the spring 140 is at least partly surrounded by the circular wall 137.

Figure 11:
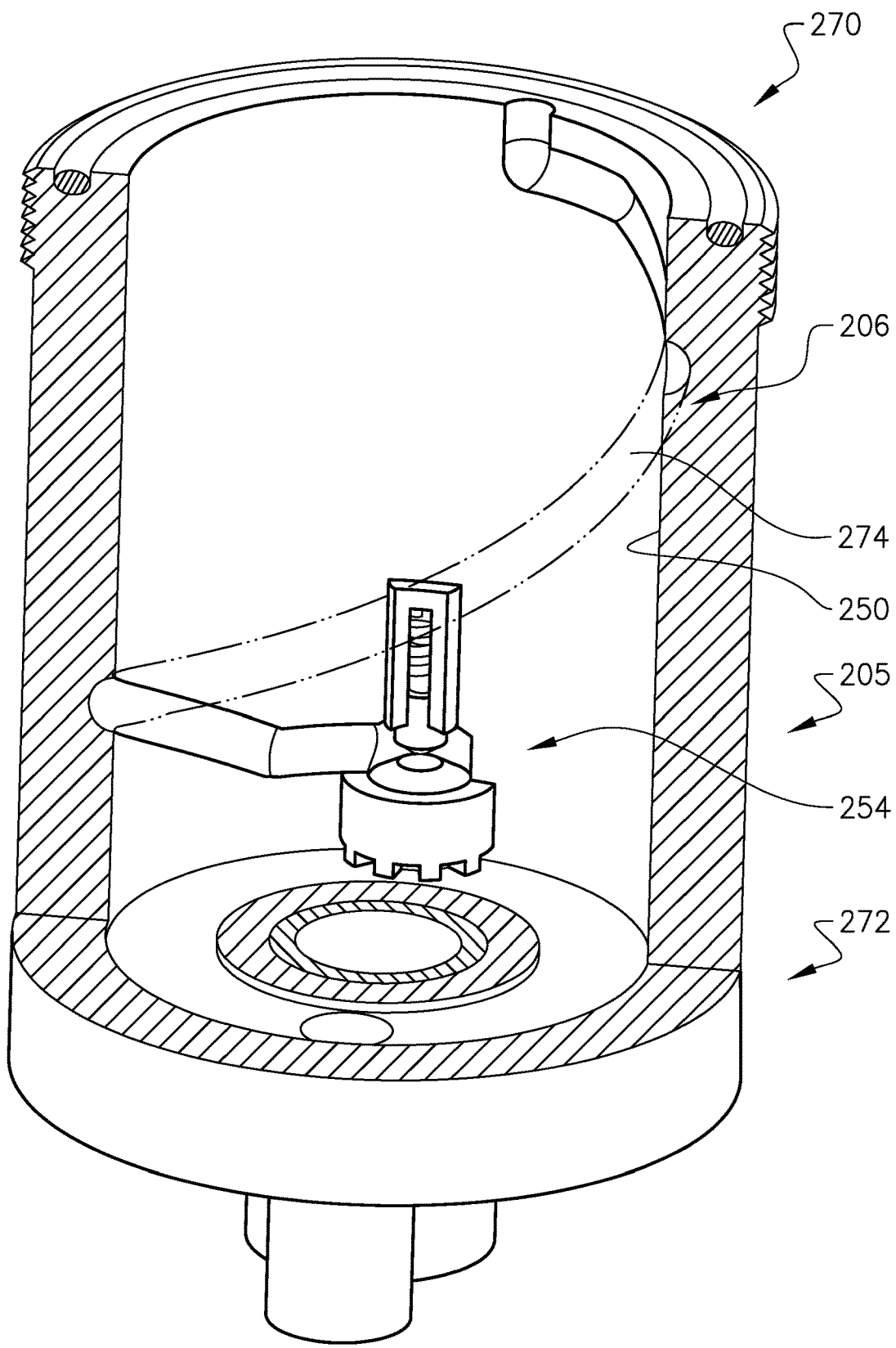

FIG. 11 discloses a filter housing 205 according to a second embodiment example. Only the main differences in relation to the first embodiment example will be described below. The filter housing 205 comprises a drainage valve 254. The inner peripheral wall 250 of the filter housing 205 is provided with a groove 206 for engagement with the drainage member 104 during movement of the filter insert 100 relative to the filter housing 205. The groove 206 has a first, upper portion 274, which is helical and a second, lower portion 276 in communication with the first portion, which is curved, extending in a transverse direction of the filter housing, similar to the lower portion 174 of the first embodiment example. The helical first, upper portion 274 extends about one complete turn from an upper access opening 270 to a lower portion 272 of the filter housing 205, where it is in communication with the second portion 276 of the groove.

FIGS. 12 and 13 are perspective views from the top and bottom, respectively of a filter insert removal tool 180 according to a first embodiment example. The filter insert removal tool 180 comprises means 192 for engaging the engagement means 182 of the filter insert 100 and removal of the filter insert after removal of the lid 120. The engagement means 192 comprises a plurality of circumferentially spaced engagement elements in the form of hooks for engagement with the complimentary shaped engagement elements of the filter insert 100. The filter insert removal tool 180 comprises a plate shaped portion 194. In the example shown, the plate shaped portion 194 of the filter insert removal tool 180 has a circular shape. The engagement means 192 is arranged on one side of the plate shaped portion. Preferably, the engagement means 192 is formed in one piece with the plate shaped portion 194. Further a wall 196 projects perpendicularly from a periphery of the plate shaped portion surrounding the engagement means 192. Thus, the filter insert removal tool 180 is cup-shaped. The plate shaped portion 194 of the filter insert removal tool 180 should have a larger size than an outer circumference of the filter housing 105 at its upper region 170 so that the wall 196 may encompass the filter housing 105 when the filter insert removal tool 180 is attached to the filter insert 100 from above via the bayonet catch 182,192. Further, the filter insert removal tool 180 comprises a handle 198 on an opposite side of the plate shaped portion 194 relative to the engagement means 192. Further, the filter insert removal tool 180 comprises at least one support member 199a, 199b projecting from the plate shaped portion 194. The support member 199a, 199b forms a support for resting the filter insert removal tool 180 with an attached filter insert in an upside down position so that any remaining fluid in the used filter insert can be collected in the cup-shaped part of the filter insert removal tool 180. The support member 199a, 199b may be formed as part of the handle or, in accordance with FIG. 12-13, as a separate structure at a distance from the handle 198. The support member 199a, 199b may have an axial extension commensurate with an axial extension of the handle 198, wherein the handle forms part of the support structure.

Figure 14:
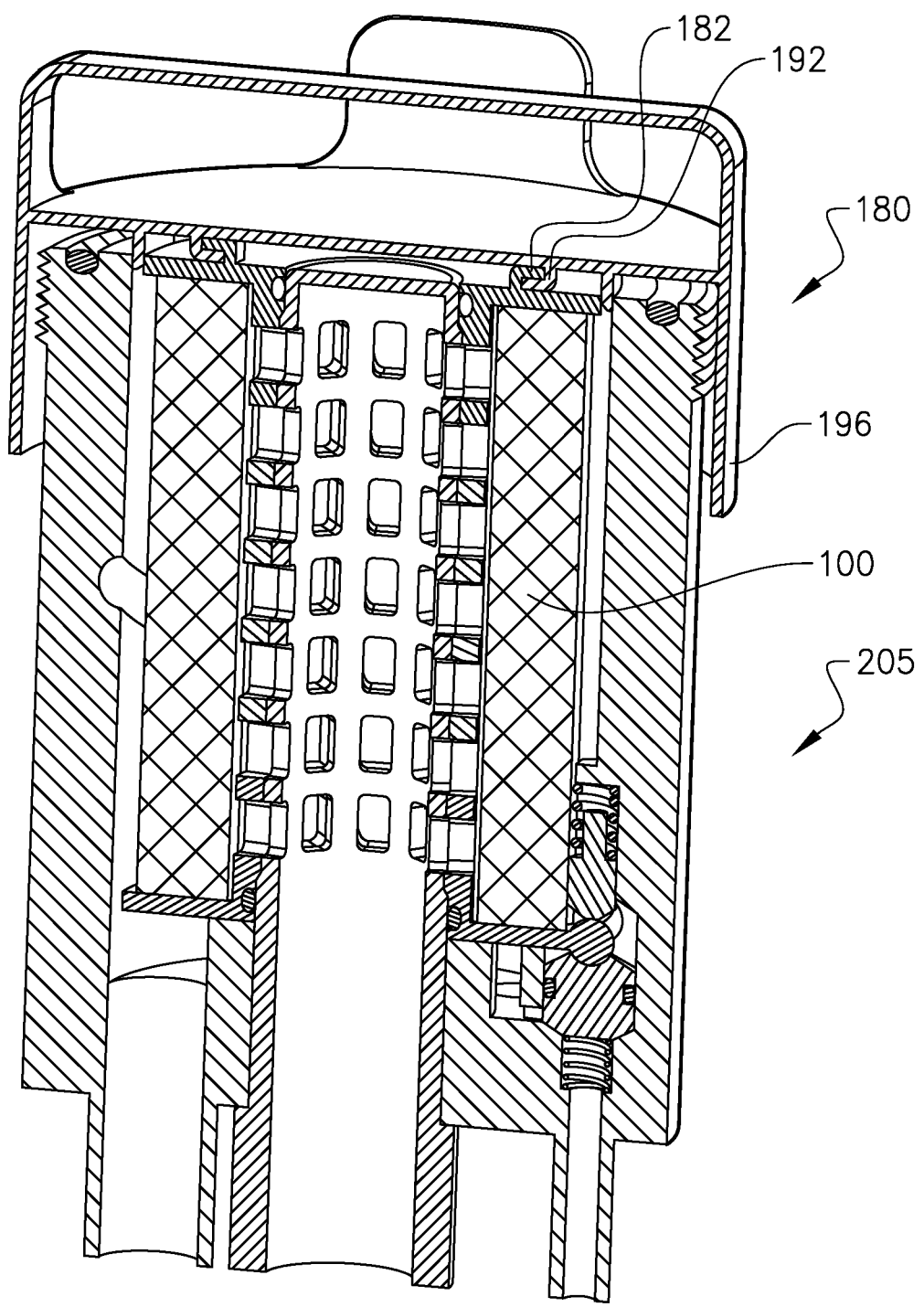
Figure 15:
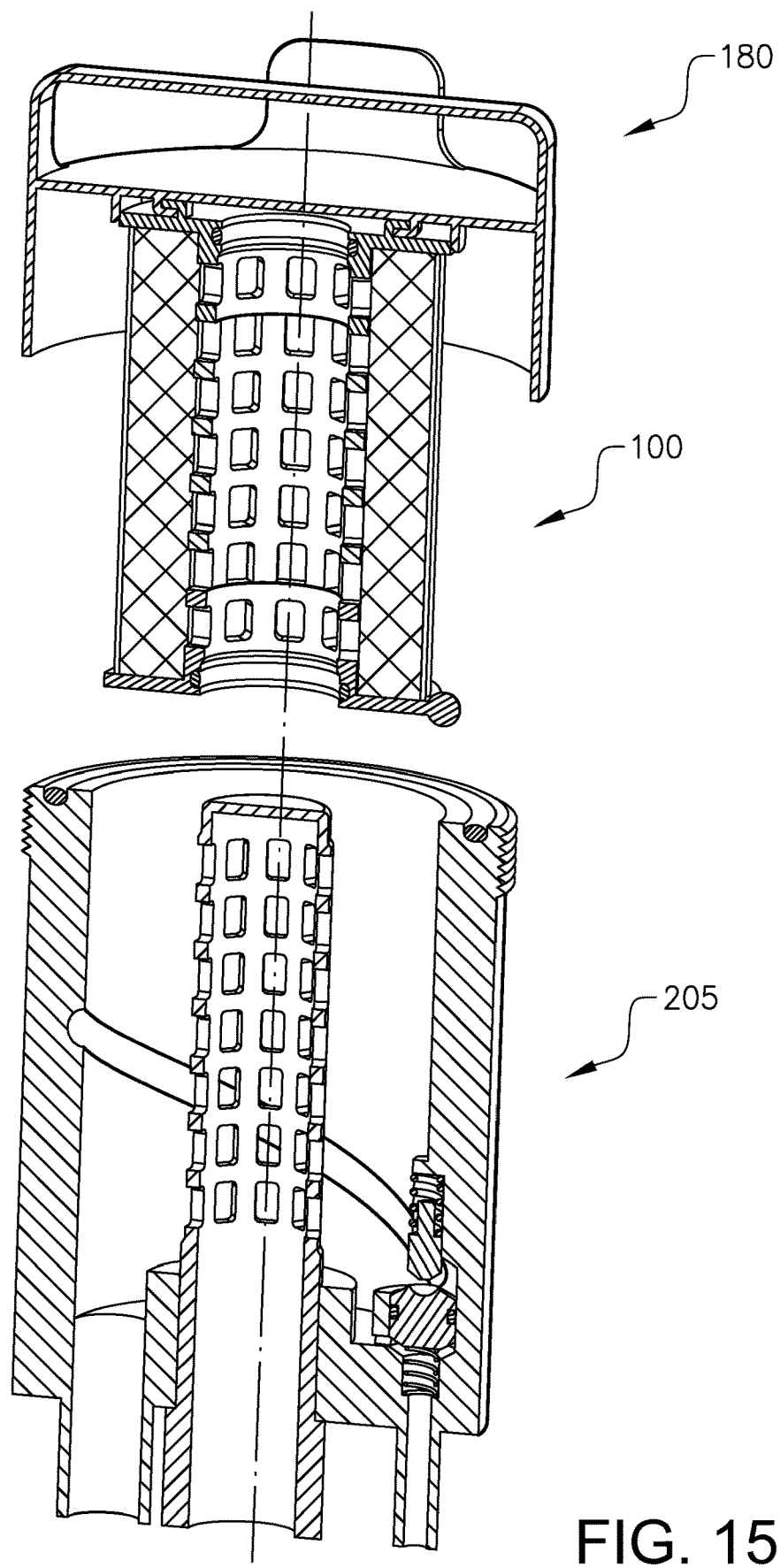

FIG. 14 discloses attachment of the filter insert removal tool 180 to a used filter insert 100 positioned in the filter housing 205. The wall 196 of the filter insert removal tool 180 extends a distance in the longitudinal direction of the filter housing 205 on an outside of the filter housing when the bayonet catch 182,192 is engaged. The filter insert 100 can then be removed from the filter housing 205 by operating the filter insert removal tool 180. FIG. 15 discloses the filter insert removal tool 180 attached to the used filter insert 100, wherein the filter insert 100 is removed from the filter housing 205.

Figure 16:
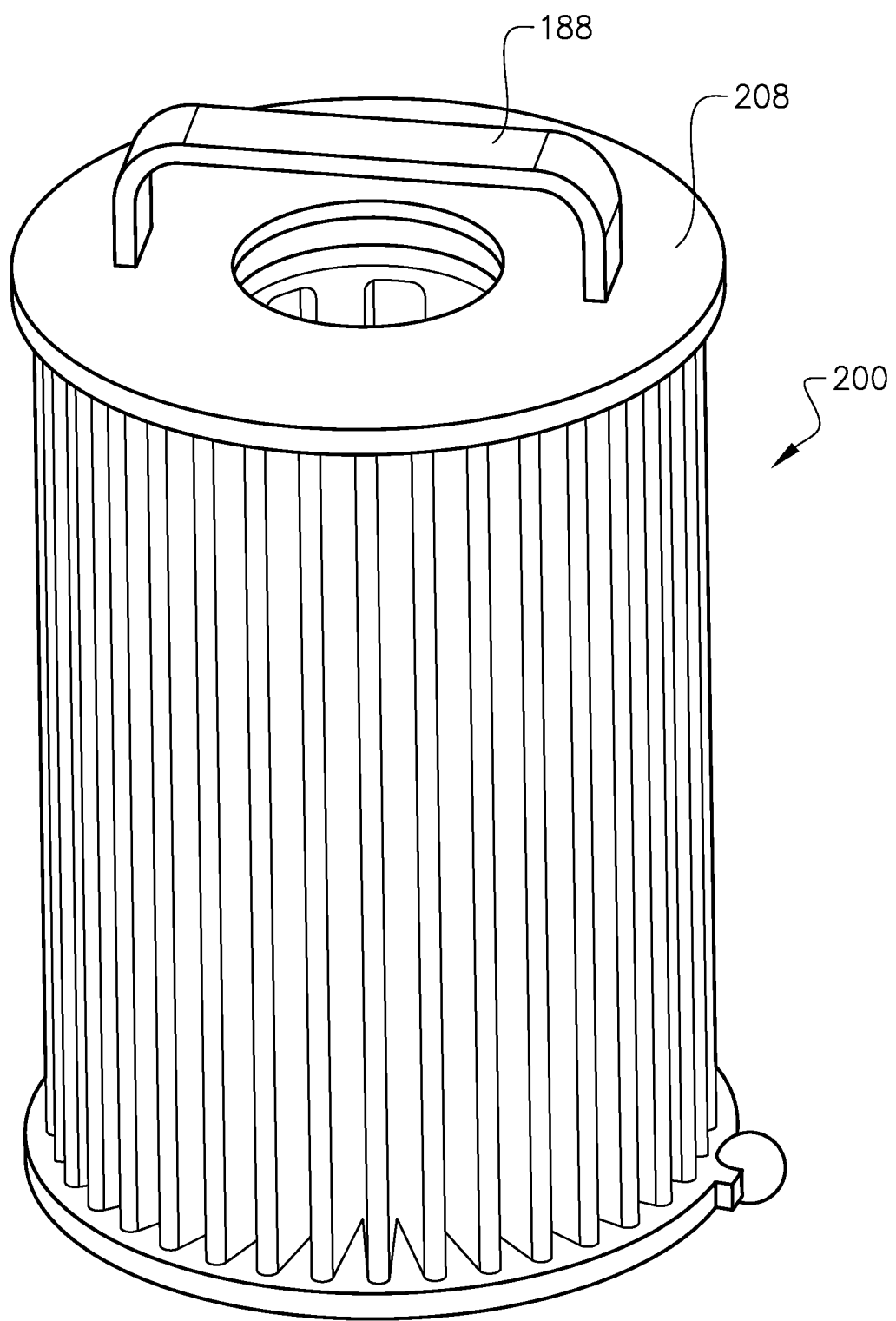

FIG. 16 discloses a perspective view from the top of a filter insert 200 according to a second embodiment example. Only the main differences in relation to the first embodiment example will be described below. The filter insert is provided with a handle 188 on its upper panel 208 for gripping during filter insert removal. The handle 188 is formed in a one-piece unit with the upper panel 208. The handle 188 may alternatively be formed by an extensible or foldable handle. There is then no need for the bayonet catch means according to the first embodiment example. Further, there is then no need for the filter insert removal tool for removing the filter insert.

Figure 17:
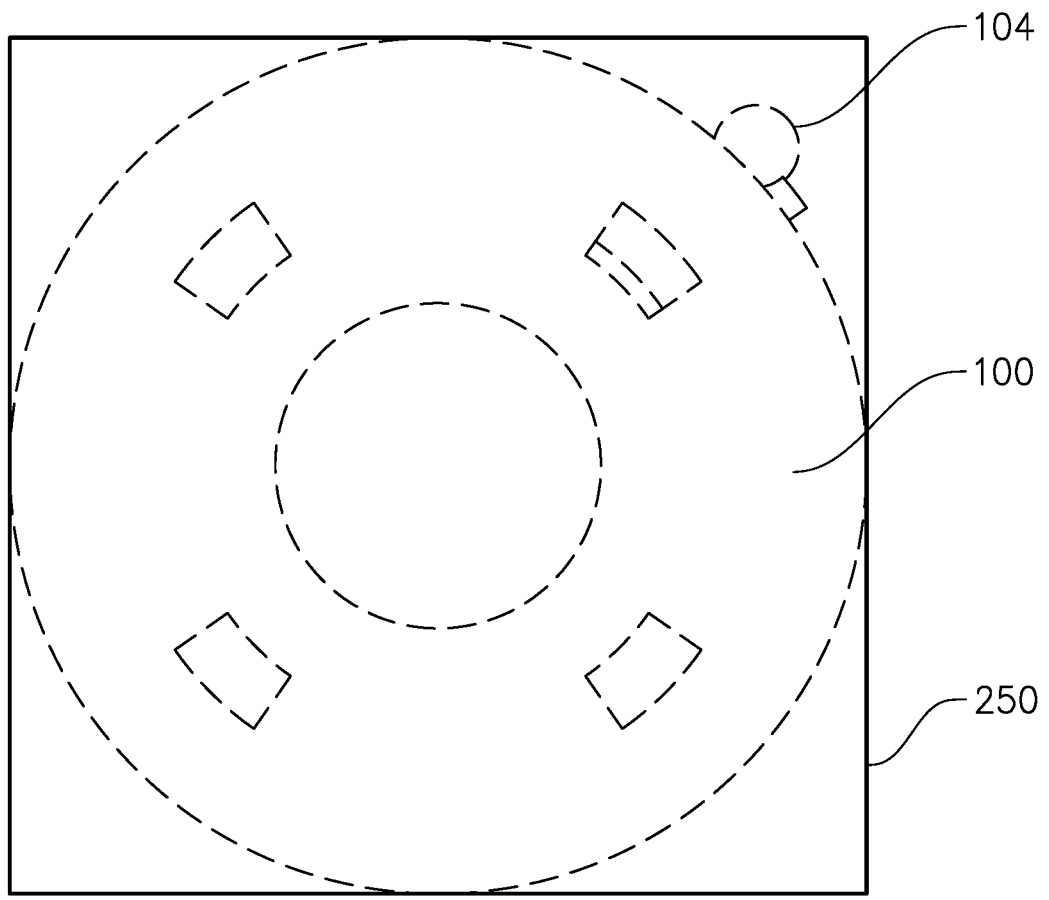

FIG. 17 discloses the filter insert 100 according to the first embodiment example positioned inside a transport box 250 with a rectangular cross section shape. It is shown how the drainage member 104 fits nicely into one corner of the rectangular transport box 250.

It is to be understood that the present invention is not limited to the embodiments described above and illustrated in the drawings; rather, the skilled person will recognize that many changes and modifications may be made within the scope of the appended claims.

According to an alternative embodiment of the filter insert, the drainage member may project radially inwards from an inner circumference of the hollow filter material body. A corresponding groove for receiving the drainage member would then have to be provided in a radially external wall of a centre column in the filter housing. Further, the drainage valve would then have to be provided in a centre portion of the filter housing bottom, adjacent the outlet (return).

According to an alternative embodiment of the filter insert, the drainage member may be designed and positioned in different ways. For example, the drainage member may have an extension so that it is in its entirety above a plane defined by the lower surface of the lower end panel. In other words, the drainage member may have an extension so that it does not project axially downwards from the lower surface of the lower end panel. Such a design may be beneficial for transport package purposes. Further, the drainage member may be designed so that it does not extend axially symmetrically in relation to the lower panel. In other words, the drainage member may extend to different extents axially on each side of the lower panel. According to a further example, the drainage member may be non-spherical. For example, the drainage member may be formed by a pin or other types of elongated element extending radially from an envelope surface of the lower end panel.

The invention claimed is:

1. A filter insert for being removably arranged in a filter housing, wherein the filter insert comprises:
    a drainage member projecting from a first end of the filter insert;
    a filter material body comprising a pleated paper structure forming a hollow cylindrical shape and a longitudinal axis; and
    a filter material body support structure;
    an opening extending from a first end of the filter insert to a second end of the filter insert, wherein the opening is configured to mount on a center post of the filter housing,
    wherein the drainage member forms a drainage valve actuator for actuating a drainage valve in the filter housing and projects in a transverse direction in relation to an axial direction of the filter insert, and the drainage member has a spherical form,
    wherein the longitudinal axis of the filter material body extends along the axial direction of the filter insert, wherein the filter material body support structure is at at least one end of the filter insert in the axial direction, wherein the filter material body support structure has a main extension in a radial direction of the filter insert, wherein the drainage member is rigidly attached to the filter material body support structure, and wherein the axial direction is perpendicular to the radial direction,
    wherein the drainage member is a rigid body.

2. A filter insert according to claim 1, wherein the drainage member is adapted to actuate a drainage valve in the filter housing for movement of the drainage valve relative to an aperture in the filter housing.

3. A filter insert according to claim 1, wherein the drainage member is adapted to engage a groove in an inner peripheral wall of the filter housing for guiding the filter insert relative to the filter housing during insertion and/or removal.

4. A filter insert according to claim 3, wherein the spherical form of the drainage member comprises a part with a rounded surface for engaging the groove in the inner peripheral wall of the filter housing.

5. A filter insert according to claim 1, wherein an outer circumference of the filter insert has a circular shape and the drainage member projects radially relative to the outer circumference of the filter insert.

6. A filter insert according to claim 1, wherein a peripheral surface of the filter material body support structure has a circular shape.

7. A filter insert according to claim 1, wherein the drainage member is welded to the filter material body support structure.

8. A filter insert according to claim 1, wherein the filter insert comprises means for engagement with a filter insert removal tool.

9. A filter insert according to claim 8, wherein the means for engagement forms a part of a bayonet catch.

10. A filter insert according to claim 1, wherein the filter insert is adapted for filtering oil for an internal combustion engine.

11. A filter insert according to claim 1, further comprising a fluid permeable center tube extending from the first end to the second end of the filter insert.

* * * * *